(No Model.)
W. PLUMER.
PROCESS OF AND APPARATUS FOR MANUFACTURING AND DESICCATING ANIMAL AND VEGETABLE SUBSTANCES.
No. 247,579. Patented Sept. 27, 1881.
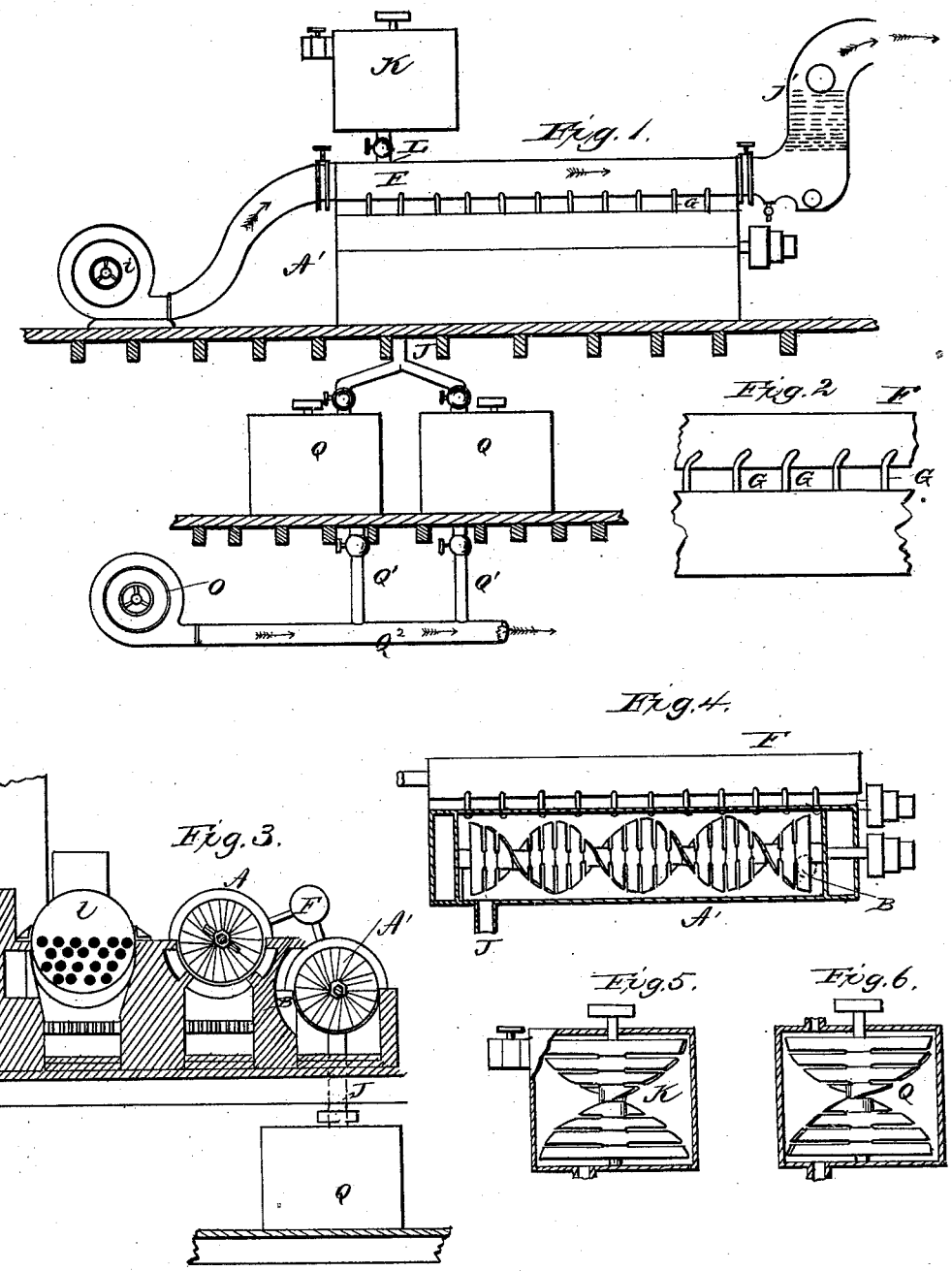
Witnesses.
A. L. Durand
M. L. Stowell
Inventor
Wm Plumer
By Stout and Underwood
Attorneys

UNITED STATES PATENT OFFICE.

WILLIAM PLUMER, OF LEXINGTON, MASSACHUSETTS.

PROCESS OF AND APPARATUS FOR MANUFACTURING AND DESICCATING ANIMAL AND VEGETABLE SUBSTANCES.

SPECIFICATION forming part of Letters Patent No. 247,579, dated September 27, 1881.

Application filed July 19, 1881. (No model.)

*To all whom it may concern:*

Be it known that I, WM. PLUMER, of Lexington, in the county of Middlesex and State of Massachusetts, have invented certain Improvements in Processes of and Apparatus for the Manufacturing and Desiccating of Various Products from Animal and Vegetable Substances, of which the following is a specification.

This invention has for its object the utilization and preservation of animal and vegetable substances without the use of salt or any antiseptic chemical, converting them into a fine dry powder, yet retaining all the valuable and nutritious properties originally contained in the raw material; and it consists in the process and apparatus hereinafter described, and specifically pointed out in the claims.

Of the accompanying drawings, forming a part of this specification, Figure 1 represents a side elevation of an apparatus embodying my invention, with letters of reference to the various parts. Fig. 2 is a detail. Fig. 3 is a vertical cross-section, showing the retorts A and A' and connections, and a steam-boiler or generator, $l$, located, preferably, by the side of the retort A, to furnish steam to be employed as a motor for the propelling devices, &c., as shown and described in my former patent, dated June 1, 1880, on which this is in part an improvement. Figs. 4, 5, and 6 are detail sectional views, showing the rotating stirrers and propellers within the retorts and the vessels K and Q, respectively.

In carrying out my invention, I provide chambers or retorts A A', made, preferably, in sections and fitted together, or in one continuous length, two completed chambers or retorts being the number preferred, although the number may be varied according to circumstances. The retorts are preferably cylindrical, with hand-holes at short intervals on the top, and are strongly built of boiler or cast iron, and each is set horizontally.

When two retorts are employed, one is located above the other, so that matter can pass from one to the other by gravitation through a pipe, in which should be placed a valve to regulate the discharge.

The retorts may be jacketed or heated by direct heat from a furnace under the retorts. Each retort is provided with a longitudinal shaft, on which are arranged any suitable arms or propellers, constructed in two series, which are fitted spirally on the shaft by suitable collars, and set obliquely to the shaft at any desired angle, in order to carry the material forward or back, as may be required.

F, Fig. 2, represents a pipe or chamber, connected by several pipes, G, with the upper portions of the retorts A A', the pipes G not extending the entire length over the retort A', and at least ten feet from the delivery-pipe J, as otherwise dry material, in the form of fine powder, would be sucked through the pipes G, causing inconvenience and loss; or the pipe F may be within the retorts, either in the middle or on one side near the top, and perforated with small holes within ten feet of the pipe J, for the reasons before stated.

The pipe F, which receives the steam and gases from the retorts A A', is connected at one end with a blower, $i$, of any suitable construction, which forces the steam or vapors through the pipe and elbow $j$, as hereinafter described, thereby causing a partial vacuum in the retorts A A' and the receptacles Q Q.

The retort A is provided with a pipe, L, for the introduction into said retort of materials to be desiccated, and the retort A' with a pipe, J, for the discharge of the materials when desiccated.

The pipes I J are provided with valves to regulate the amount received and discharged, as well as to close the retorts. When in operation, the retorts A A' and the receptacles Q Q are hermetically closed.

The pipe B, which connects the retorts A A', is located near the ends of said retorts, opposite the ends with which the pipes I and J connect, so that material entering the retorts has to pass entirely through both before escaping.

K represents a receiving-tank, made of strong boiler-iron, a suitable shaft and stirrers to mix the material and force the same downward through the pipe J, and preferably should be placed directly over the retort A, with a pipe, L, and hand-hole for filling.

The material having been first ground or crushed, when the same is required, and deposited by any suitable contrivance into the tank K, passes continuously from the tank K through the pipe L into the retort A, the quantity being regulated by the valve in said pipe L. The stirrer or propeller in the retort A is rotated in the proper direction to force the material toward the pipe connecting with A', and in its passage becomes partially dried and pulverized. From there it passes through the pipe into the retort A', and is carried by the stirrer in the proper direction and usually becomes sufficiently dry by the time it reaches the pipe J. If not sufficiently dry the stirrers can be reversed, so as to carry the material again through the length of the retorts and back, and the motion of the stirrers may be regulated by cone-pulleys to carry the material faster or slower. After the material is sufficiently dry it passes in a continuous stream through the pipe J into a closely-closed receptacle Q, from whence it is removed, as hereinafter described.

During the drying operation just described the steam and gases evolved from the material by the heat and agitation are forced through the pipe F by the blower $i$, the pipe F terminating in an elbow, $j$, this elbow having a chamber wherein are placed on a wire netting niter-cake and broken charcoal, or some other chemical or absorbent of ammonia, should any be evolved, either as the result of partial decomposition or partial destructive distillation. This elbow is made with suitable hand-holes near the top and bottom to remove and renew the niter-cake, and to clean out any dry powder which may be deposited therein. The steam and vapors having been thus filtered, and the ammonia, if any, absorbed, is allowed to pass into the open air or under the furnace.

When the materials used are decomposed the steam and gases should be directly forced from the pipe F into any suitable condenser and the ammonia fixed by the use of sulphuric acid or other chemicals.

I do not consider the use of niter-cake or any chemical as absolutely essential to my process, and only to be used with decomposed materials or where there is danger from destructive distillation, which latter should in all cases be avoided, if possible, by properly regulating the heat.

I provide two receptacles, Q, with rotary stirrers and propellers to force the material through the pipe Q' into barrels or other receptacles, one being filled while the other is discharging, which last is closed with a valve.

I preferably connect the pipes Q' with a blower, O, of any suitable construction, by means of pipe Q², to convey the dried material to any desired point, either for grinding or packing, thus cooling and aerating the material on its passage, which very much facilitates the process, as it must in some way be cooled and aerated before it can be packed with safety.

By the above process and apparatus I desiccate, to great profit and economy, meat and soups of all kinds, cooked or uncooked, blood, slaughter-house renderings, raw fresh fish, "fresh-fish refuse," so called—such as heads and backbones, properly washed and cleaned, when intended for food—or any other material requiring desiccation and used either for food or fertilizers, not only by this process saving the expense of cooking, salting, and pickling, but in addition retaining in the desiccated material and in a condensed form all the juices and gluten, which, in the usual method of preparing and drying fertilizers from such material, neither can be nor are ever saved, though containing a very large per cent. of valuable plant-food.

I claim my invention and process is of great value and utility, not only for the purpose of manufacturing a complete fertilizer containing all the properties in the original material, but that I can more especially by this process and by the same apparatus produce a rich and nutritious food for man or for animal containing all the phosphates and nutritious properties found in the raw material in a condensed form, and not liable to decomposition.

By this process I utilize and convert into a wholesome food an immense amount of materials, such as the heads and backbones of fish, which heretofore have been wasted or partially converted into a fertilizer.

I claim as my invention—

1. The hereinbefore-described process of desiccating animal and vegetable substances and converting the same into powdered products, consisting in forcing the said substances, suitably subdivided, through heated retorts and into suitable receptacles, and carrying off the gases and vapors engendered by the heat by a blast of air through a pipe connected with the retorts, but without actual contact with the material being treated, and afterward cooling and aerating the material by another blast of air after the said material has passed through the retorts, substantially as set forth.

2. The combination, substantially as set forth, of a receiving-tank, K, two or more retorts, A A', each having a rotary stirrer or propeller, a pipe, F, connected to said retorts to receive the steam and gases from the retorts, and the blower $i$ to force the steam or gases from the pipe F into the elbow $j$, and from thence into the open air or under the furnace, substantially as set forth.

3. The combination of the connected retorts A A', the chamber F, communicating with said retorts, the blower $i$, connected with said chamber F, and the receptacles Q, all arranged and operating substantially as set forth.

4. The retorts A A', the pipe F, the blower $i$, the receptacles Q, and the blower O, to remove and aerate the desiccated material, all arranged and operating substantially as set forth.

WILLIAM PLUMER.

Witnesses:
J. EDWARD WRIGHT,
THOMAS GRAY.